United States Patent
Takeuchi et al.

(10) Patent No.: US 8,658,008 B2
(45) Date of Patent: Feb. 25, 2014

(54) HIGH-PRESSURE HYDROGEN PRODUCING APPARATUS

(75) Inventors: Jun Takeuchi, Wako (JP); Kenji Taruya, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 198 days.

(21) Appl. No.: 13/372,496

(22) Filed: Feb. 14, 2012

(65) Prior Publication Data
US 2012/0222955 A1  Sep. 6, 2012

(30) Foreign Application Priority Data
Mar. 1, 2011 (JP) ................. 2011-043510

(51) Int. Cl.
C25B 1/12 (2006.01)
C25B 15/08 (2006.01)

(52) U.S. Cl.
USPC ............ 204/256; 204/258; 204/266; 205/628

(58) Field of Classification Search
None
See application file for complete search history.

(56) References Cited

U.S. PATENT DOCUMENTS

| | | | | |
|---|---|---|---|---|
| 5,037,518 A | * | 8/1991 | Young et al. ............... | 204/228.5 |
| 5,484,512 A | * | 1/1996 | Sasaki et al. .............. | 205/628 |
| 5,690,797 A | * | 11/1997 | Harada et al. ............. | 204/228.5 |
| 5,796,799 A | * | 8/1998 | Kobayashi et al. ......... | 376/306 |
| 7,351,316 B2 | * | 4/2008 | Yoshida et al. ............ | 204/252 |

FOREIGN PATENT DOCUMENTS

JP  2006-347779  12/2006

OTHER PUBLICATIONS

Grigoriev et al, High-pressure PEM water electrolysis and corresponding safety issues, Internation Journal of Hydrogen Energy, vol. 36, Apr. 2010, pp. 2721-2728.*
Medina et al, Analysis of water transport in a high pressure PEM electrolyzer, Internation Journal of Hydrogen Energy, vol. 35, Apr. 2010, pp. 5173-5186.*

* cited by examiner

*Primary Examiner* — Harry D Wilkins, III
(74) *Attorney, Agent, or Firm* — Ditthavong Mori & Steiner, P.C.

(57) ABSTRACT

A high-pressure hydrogen producing apparatus includes a first cell device and a second cell device. The first cell device includes an electrolyte membrane, an anode electrode catalyst layer and an anode current collector provided on a first surface of the electrolyte membrane, and a cathode electrode catalyst layer and a cathode current collector provided on a second surface of the electrolyte membrane. The second cell device includes an electrolyte membrane, an anode current collector provided on a first surface of the electrolyte membrane of the second cell device, and a cathode current collector provided on a second surface of the electrolyte membrane of the second cell device.

5 Claims, 4 Drawing Sheets

HIGH-PRESSURE HYDROGEN PRODUCING APPARATUS

CROSS-REFERENCE TO RELATED APPLICATIONS

The present application claims priority under 35 U.S.C. §119 to Japanese Patent Applications No. 2011-043510 filed Mar. 1, 2011, entitled "High-Pressure Hydrogen Producing Apparatus". The contents of this application are incorporated herein by reference in their entirety.

BACKGROUND OF THE INVENTION

1. Field of the Invention

The present invention relates to a high-pressure hydrogen producing apparatus.

2. Discussion of the Background

Generally, hydrogen is used as a fuel gas to be used in the power generation reaction of a fuel cell. This hydrogen gas is generated by a water electrolysis apparatus. The water electrolysis apparatus employs a solid polymer electrolyte membrane (ion exchange membrane) for decomposing water to generate hydrogen (and oxygen). Electrode catalyst layers are disposed on the respective sides of the solid polymer electrolyte membrane, forming an electrolyte membrane/electrode assembly. Current collectors are disposed on the respective sides of the electrolyte membrane/electrode assembly, making up a unit cell.

A plurality of such units are stacked to form a cell unit. A voltage is applied across the cell unit while water is supplied to the current collectors on the anode side. On the anodes of the electrolyte membrane/electrode assembly, water is decomposed to produce hydrogen ions (protons). The hydrogen ions move through the solid polymer electrolyte membranes to the cathodes to be combined with electrons to generate hydrogen. On the anodes, oxygen generated together with hydrogen is discharged with excess water from the cell unit.

SUMMARY OF THE INVENTION

According to one aspect of the present invention, a high-pressure hydrogen producing apparatus for electrolyzing water supplied to an anode side to generate oxygen on the anode side and hydrogen with a pressure higher than a pressure of the oxygen on a cathode side includes a first cell device and a second cell device. The first cell device has a plurality of first unit cells stacked in a gravitational direction. The second cell device is coupled to a lower end of the first cell device in the gravitational direction and has a plurality of second unit cells stacked in the gravitational direction. The first cell device includes an electrolyte membrane, an anode electrode catalyst layer and an anode current collector provided on a first surface of the electrolyte membrane, and a cathode electrode catalyst layer and a cathode current collector provided on a second surface of the electrolyte membrane. The second surface is provided on an opposite side of the electrolyte membrane to the first surface in the first cell device. The first cell device serves as a water electrolysis cell to electrolyze the water. The second cell device includes an electrolyte membrane, an anode current collector provided on a first surface of the electrolyte membrane of the second cell device, and a cathode current collector provided on a second surface of the electrolyte membrane of the second cell device. The second surface is provided on an opposite side of the electrolyte membrane to the first surface in the second cell device. The second cell device serves as a water permeation cell to cause moisture on the cathode side to permeate toward the anode side.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
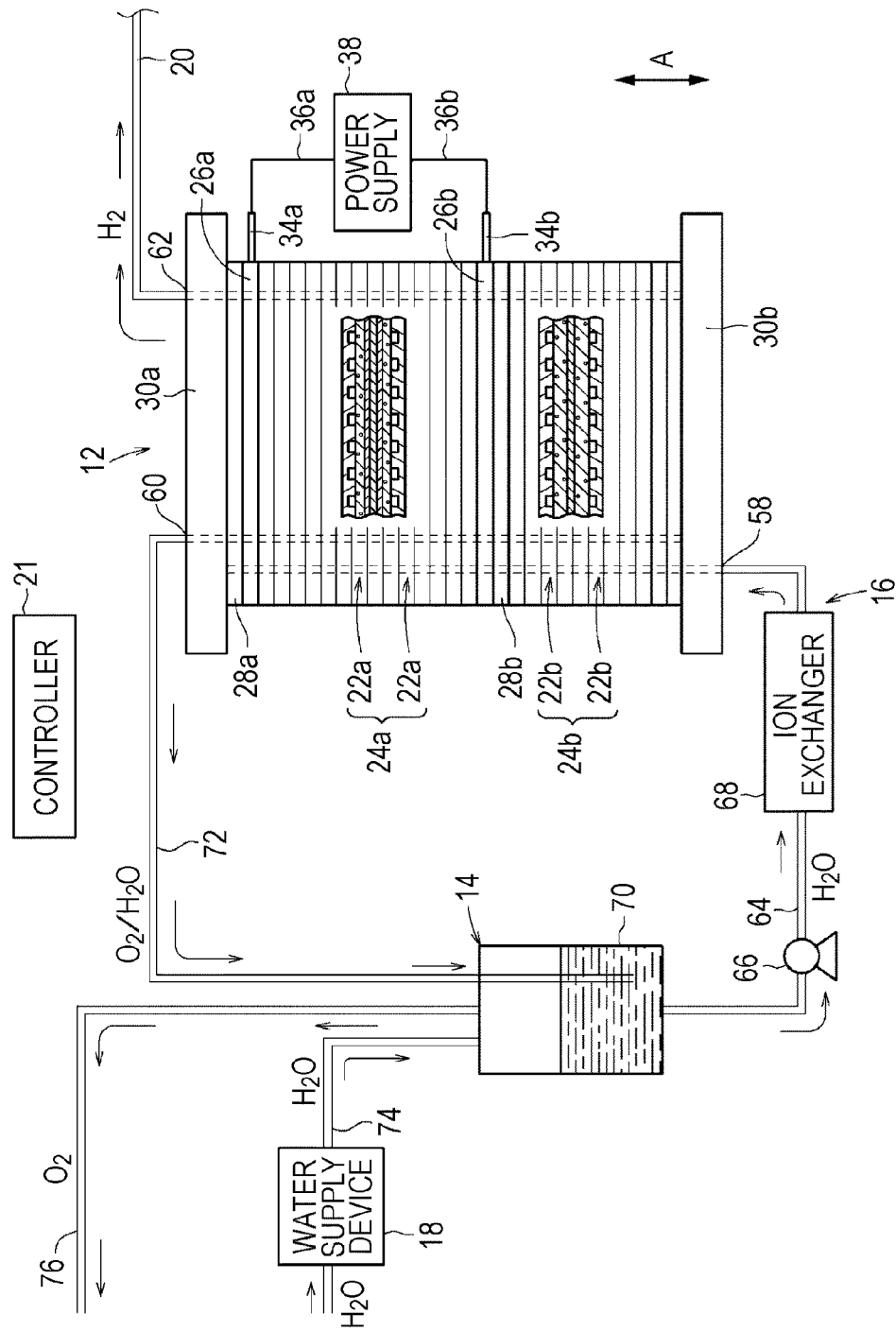
FIG. 1 is a diagram illustrating the schematic configuration of a water electrolysis system according to a first embodiment of the disclosure.

The embodiments will now be described with reference to the accompanying drawings, wherein like reference numerals designate corresponding or identical elements throughout the various drawings.

As shown in FIG. 1, a water electrolysis system 10 includes a high-pressure hydrogen producing apparatus 12 according to a first embodiment of the present disclosure that electrolyzes water (pure water) to produce oxygen and high-pressure hydrogen (hydrogen with a pressure higher than the oxygen pressure or the normal pressure of, for example, 1 MPa to 70 MPa)

A gas-liquid separator 14, a water circulating apparatus 16, and a water supply device 18 are provided on the anode side of the high-pressure hydrogen producing apparatus 12. The gas-liquid separator 14 separates oxygen and excess water discharged from the high-pressure hydrogen producing apparatus 12 from each other, and stores the water. The water circulating apparatus 16 circulates the water stored in the gas-liquid separator 14 to the high-pressure hydrogen producing apparatus 12. The water supply device 18 supplies pure water produced from commercial water to the water gas-liquid separator 14.

A high-pressure hydrogen pipe 20 to which high-pressure hydrogen is supplied from the high-pressure hydrogen producing apparatus 12 is provided on the cathode side of the high-pressure hydrogen producing apparatus 12. A hydrogen filling nozzle (not shown), for example, is mounted to the high-pressure hydrogen pipe 20. This hydrogen filling nozzle is detachably mounted to the fuel filling section of a fuel-cell electric vehicle (not shown) to fill hydrogen as a fuel gas. The water electrolysis system 10 includes a controller 21 which performs the general control of the system.

The high-pressure hydrogen producing apparatus 12 includes a first cell unit 24a having a plurality of first unit cells 22a stacked in a gravitational direction (direction of arrows A), and a second cell unit 24b coupled to a gravitational-directional lower end of the first cell unit 24a and having a plurality of second unit cells 22b stacked in the gravitational direction.

A terminal plate 26a, an insulating plate 28a, and an end plate 30a are mounted on the upper end of the first cell unit 24a in the stacking direction in the order named. Likewise, a terminal plate 26b, an insulating plate 28b, and a second cell unit 24b are mounted on the lower end of the first cell unit 24a in the stacking direction in the order named. An end plate 30b is mounted on the lower end of the second cell unit 24b in the stacking direction. A fastening load may be applied between the end plates 30a, 30b by, for example, a plurality of tie rods (not shown) extending in the direction of the arrows A, or the components between the end plates 30a, 30b may be integrally held together in a box-like casing containing the end plates 30a, 30b as the end plates thereof.

Terminals 34a, 34b project outward from respective side edges of the terminal plates 26a, 26b. The terminals 34a, 34b are electrically connected to an electrolysis power supply 38 by wires 36a, 36b, respectively.

Figure 2:
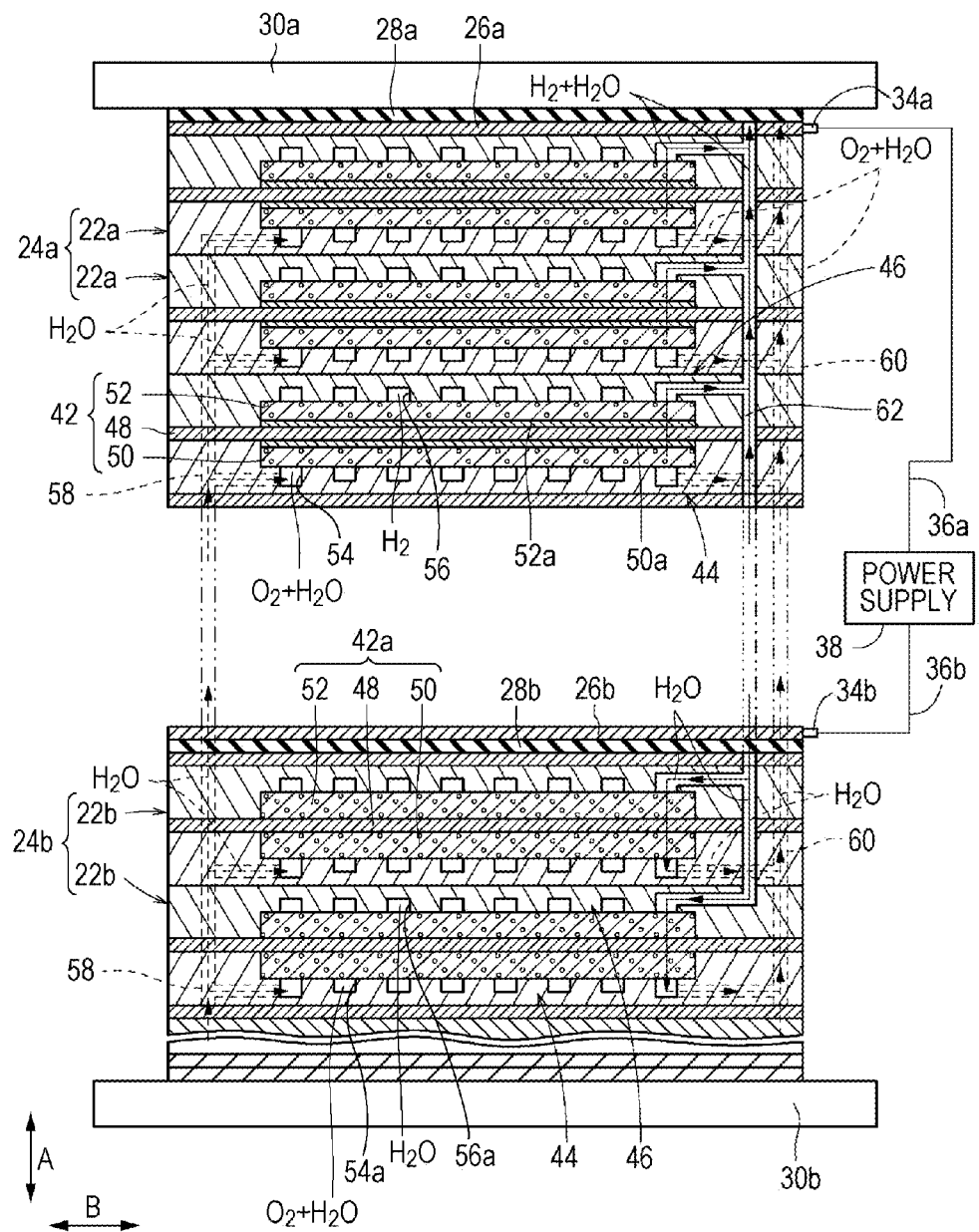
FIG. 2 is a cross-sectional view of a high-pressure hydrogen producing apparatus included in the water electrolysis system.

As shown in FIG. 2, each of the first unit cells 22a includes a disk-shaped electrolyte membrane/electrode assembly 42, and an anode separator 44 and a cathode separator 46 which sandwich the electrolyte membrane/electrode assembly 42 therebetween.

Each of the anode separator 44 and the cathode separator 46 has a disk shape and is formed by a carbon plate or the like, or is formed by a steel plate, a stainless steel plate, a titanium plate, an aluminum plate, a plated steel plate, a metal plate press-molded or cut after its surface is subjected to a corrosion-resistant treatment.

The electrolyte membrane/electrode assembly 42 has a solid polymer electrolyte membrane 48 including a thin membrane of, for example, perfluorosulfonic acid which is impregnated with water, and an anode current collector 50 and a cathode current collector 52 which are disposed on the respective surfaces of the solid polymer electrolyte membrane 48.

An anode catalyst layer 50a and a cathode catalyst layer 52a are formed on the respective surfaces of the solid polymer electrolyte membrane 48. The anode catalyst layer 50a is made of a Ru (ruthenium)-based catalyst, for example, and the cathode catalyst layer 52a of a platinum catalyst, for example.

Each of the anode current collector 50 and the cathode current collector 52 is made of sintered spherical atomized titanium powder (porous electric conductor), and has a smooth surface area which is etched after it is cut to shape. Each of the anode current collector 50 and the cathode current collector 52 may be a metal sheet, such as corrosion resistant titanium sheet, having an opening formed therein by etching, drilling, discharging, an electron beam, a laser, pressing or the like.

A first flow passage 54 is provided in a surface of the anode separator 44 which faces the electrolyte membrane/electrode assembly 42, and a second flow passage 56 is provided in a surface of the cathode separator 46 which faces the electrolyte membrane/electrode assembly 42. The first flow passage 54 is provided in a range corresponding to the surface area of the anode current collector 50. The second flow passage 56 is provided in a range corresponding to the surface area of the cathode current collector 52. Each of the first flow passage 64 and the second flow passage 56 includes a plurality of flow passage grooves, a plurality of embossed ridges, or the like.

A water supply hole 58 for supplying water (pure water) and an oxygen discharge hole 60 for discharging oxygen generated by a reaction and used water are connected to the first flow passage 54. A hydrogen discharge hole 62 for discharging hydrogen (high-pressure hydrogen) generated by a reaction is provided in the second flow passage 56. The water supply hole 58, the oxygen discharge hole 60 and the hydrogen discharge hole 62 extend in the direction of the arrows A in the stacking direction and penetrate through the first cell unit 24a and the second cell unit 24b.

Each second unit cell 22b is basically configured in the same way as the first unit cell 22a. Each second unit cell 22b includes a disk-shaped electrolyte membrane/electrode assembly 42a, and an anode separator 44 and a cathode separator 46 which sandwich the electrolyte membrane/electrode assembly 42a therebetween.

The electrolyte membrane/electrode assembly 42a has the anode current collector 50 and the cathode current collector 52 which are disposed on the respective surfaces of the solid polymer electrolyte membrane 48. The anode catalyst layer 50a and the cathode catalyst layer 52a are not disposed on the respective surfaces of the solid polymer electrolyte membrane 48.

A first flow passage 54a is provided in a surface of the anode separator 44 which faces the electrolyte membrane/electrode assembly 42a, and a second flow passage 56a is provided in a surface of the cathode separator 46 which faces the electrolyte membrane/electrode assembly 42a. The second unit cell 22b does not perform water electrolysis, and forms a water permeation cell to supply moisture containing high-pressure hydrogen to the second flow passage 56a, and supply the water through the electrolyte membrane/electrode assembly 42a to the first flow passage 54a.

As shown in FIG. 1, the water circulating apparatus 16 includes a circulation pipe 64 communicating with the water supply hole 58 of the high-pressure hydrogen producing apparatus 12. The circulation pipe 64 is connected to the bottom of a tank 70 where a circulation pump 66 and an ion exchanger 68 are disposed to form the gas-liquid separator 14.

The tank 70 has a top portion connected with one end of a return pipe 72 whose opposite end is connected to the oxygen discharge hole 60 of the water electrolysis apparatus 12. The one end of the return pipe 72 is set to a position in which the end is normally open in water stored in the tank 70.

The tank 70 is also connected with a pure water supply pipe 74 connected to the water supply device 18, and an oxygen discharge pipe 76 for discharging oxygen separated from pure water in the tank 70. The inside the tank 70 is open to the atmospheric pressure.

The operation of the water electrolysis system 10 with the foregoing configuration is described below.

First, when the water electrolysis system 10 is activated, pure water produced from commercial water is supplied through the water supply device 18 to the tank 70 constituting the gas-liquid separator 14.

In the water circulating apparatus 16, with the circulation pump 66 actuated, the water in the tank 70 is supplied through the circulation pipe 64 to the water supply holes 58 of the water electrolysis apparatus 12. A voltage is applied between the terminals 34a, 34b of the terminal plates 26a, 26b by the DC variable power supply 38 electrically connected to the terminals 34a, 34b.

In each first unit cell 22a, therefore, the water is supplied from the water supply hole 58 into the first flow passage 54 of the anode separator 44, and moves along the anode current collector 50, as shown in FIG. 2.

Therefore, the water is electrolyzed by the anode electrode catalyst layer 50a, generating hydrogen ions, electrons, and oxygen. The hydrogen ions generated by the anodic reaction move through the solid polymer electrolyte membrane 48 to the cathode electrode catalyst layer 52a where they combine with the electrons to produce hydrogen.

The produced hydrogen flows along the second flow passage 56 formed between the cathode separator 46 and the cathode current collector 52. The hydrogen is kept at a pressure higher than the pressure in the water supply hole 58, and flows through the hydrogen discharge hole 62 along the stacking direction. Accordingly, the high-pressure hydrogen can be extracted outside from the water electrolysis apparatus 12 through the high-pressure hydrogen pipe 20 (see FIG. 1).

The oxygen generated by the anodic reaction and the used water flow in the first flow passage 54. The mixed fluid of the oxygen and the water is discharged into the return pipe 72 of the water circulating apparatus 16 along the oxygen discharge hole 60. The unreacted water and the oxygen are introduced into the tank 70 where they are separated from each other. The water is then supplied from the circulation pipe 64 through the ion exchanger 68 into the water supply holes 58 by the circulation pump 66. The oxygen separated from the water is discharged through the oxygen discharge pipe 76.

The high-pressure hydrogen which flows through the hydrogen discharge hole 62 contains moisture (permeated water permeated from the anode side). This moisture is likely to move downward in the hydrogen discharge hole 62 by gravity.

According to the first embodiment, the high-pressure hydrogen producing apparatus 12 includes the first cell unit 24a having a plurality of first unit cells 22a stacked in the gravitational direction, and the second cell unit 24b connected to the gravitational-directional lower end of the first cell unit 24a and having a plurality of first unit cells 22b stacked in the gravitational direction.

Further, as shown in FIG. 2, in each second unit cell 22b constituting the second cell unit 24b, the electrolyte membrane/electrode assembly 42a is not provided with an anode electrode catalyst layer and a cathode electrode catalyst layer. Accordingly, the second unit cell 22b does not have a water electrolysis capability, so that moisture contained in high-pressure hydrogen generated in the second flow passage 56a on the cathode side or the high-pressure side can permeate through the electrolyte membrane/electrode assembly 42a to move to the first flow passage 54a on the anode side.

The moisture which has moved to the first flow passage 54a is discharged into the oxygen discharge hole 60 together with the water supplied to the first flow passage 54a from the water supply hole 58. Further, the moisture is returned to the tank 70 constituting the gas-liquid separator 14 from the oxygen discharge hole 60.

Therefore, the high-pressure hydrogen producing apparatus 12 forms a differential pressure type water electrolysis apparatus, so that high-pressure water can be permitted to permeate through the electrolyte membrane/electrode assembly 42a to the low-pressure side, and be discharged efficiently. This eliminates the need for large equipment for discharging the high-pressure water.

In addition, the second cell unit 24b is configured in the same way as the first cell unit 24a which serves as a water electrolysis cell, and can thus be coupled to the first cell unit 24a easily. This brings about an effect of effectively reducing the number of components, thus further downsizing and simplifying the whole high-pressure hydrogen producing apparatus 12.

Figure 3:
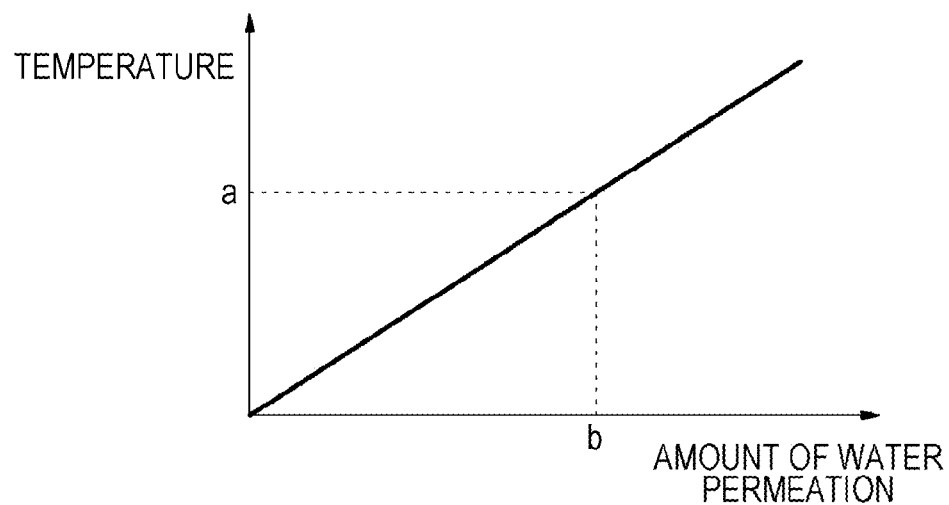
FIG. 3 is a diagram showing the relation between the amount of water permeation the temperature.

In the second unit cell 22b, the amount of water permeation through the electrolyte membrane/electrode assembly 42a from the cathode side to the anode side when a differential pressure is generated between the cathode side and the anode side can be acquired from the operational temperature of the high-pressure hydrogen producing apparatus 12. That is, when the operational temperature of the high-pressure hydrogen producing apparatus 12 is a (° C.), the amount of water permeation b (cc/min) is acquired, and the higher the operational temperature a (° C.) becomes, as shown in FIG. 3.

Figure 4:
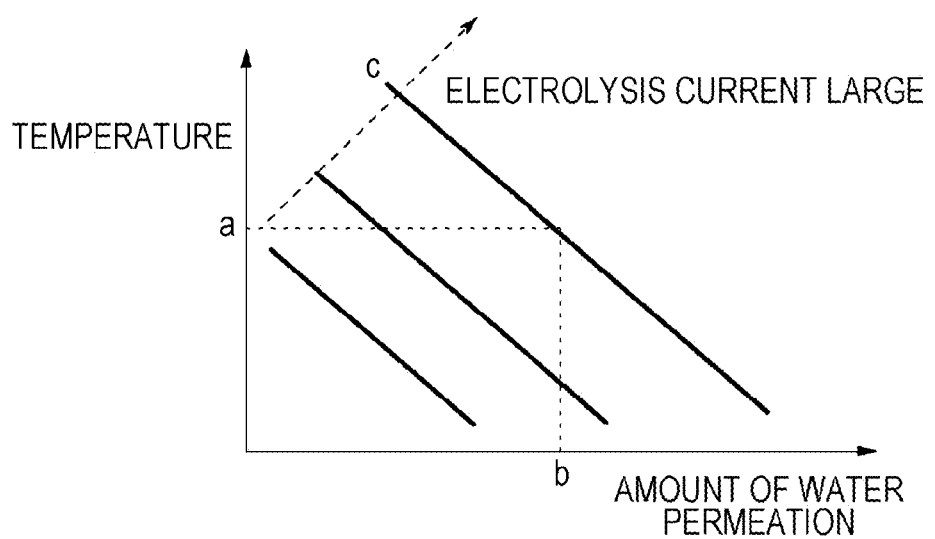
FIG. 4 is a diagram showing the relation among the amount of water permeation, the temperature and an electrolysis current.

In the first unit cell 22a constituting the first cell unit 24a, on the other hand, the amount of water permeation from the anode side to the cathode side at the time of electrolyzation is acquired from the electrolysis current in the electrolyzation. As shown in FIG. 4, therefore, the electrolysis current c (A) which balances the amount of water permeation is acquired from the operational temperature a (° C.) and the amount of water permeation b (cc/min).

The moisture which permeates to the cathode side to be contained in high-pressure hydrogen can be returned to the anode side properly and reliably by setting the ratio (the number of laminations) of the first unit cells 22a as water electrolysis cells to the second unit cells 22b as water permeation cells based on those characteristics.

Figure 5:
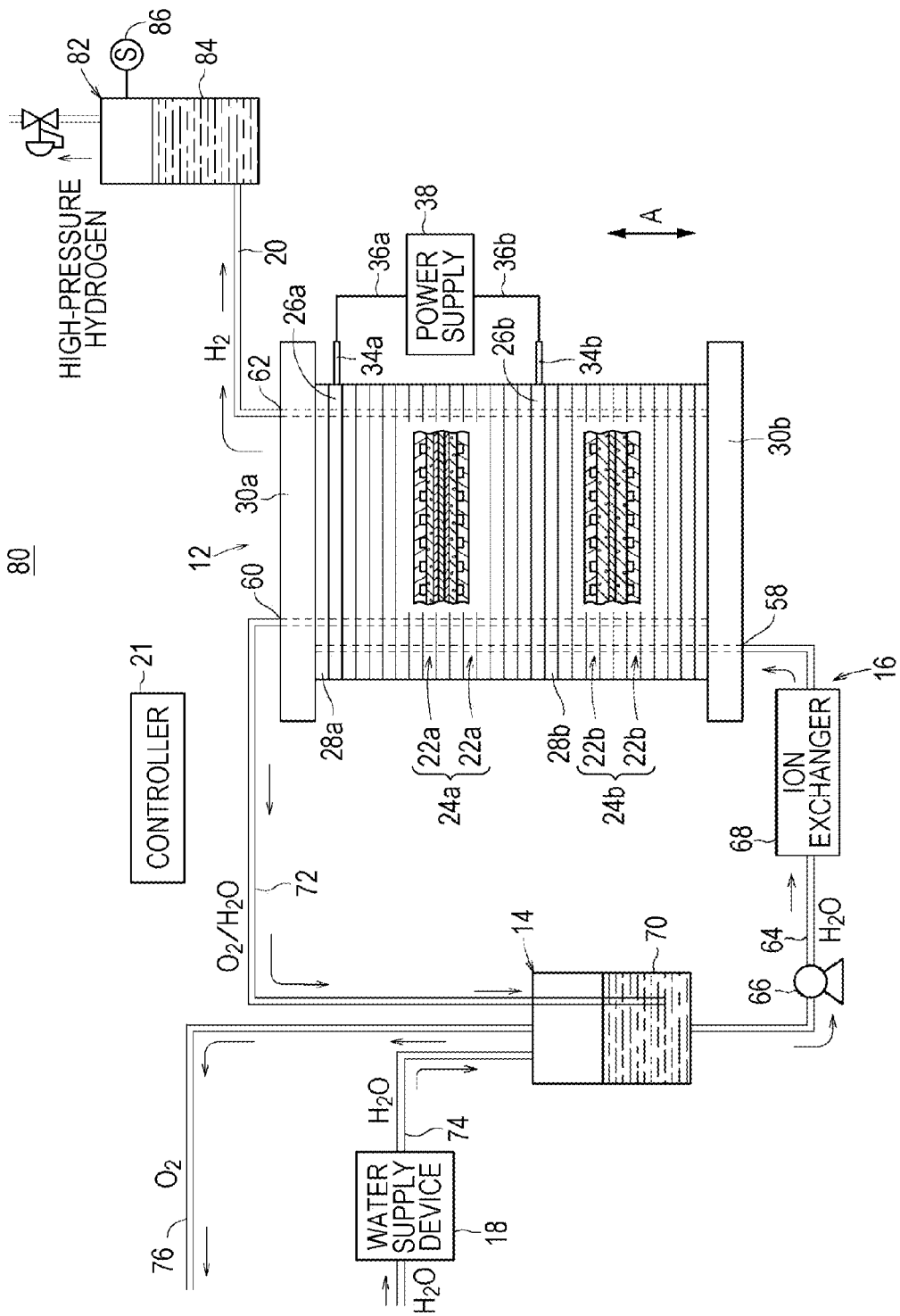
FIG. 5 is a diagram illustrating the schematic configuration of a water electrolysis system according to a second embodiment.

FIG. 5 is a diagram illustrating the schematic configuration of a water electrolysis system 80 according to a second embodiment of the disclosure. Those components of the water electrolysis system 80 which are identical to those of the water electrolysis system 10 according to the first embodiment are given the same reference symbols to avoid repeating their detailed descriptions.

In the water electrolysis system 80, a hydrogen-liquid separator 82 is connected to the high-pressure hydrogen pipe 20 of the high-pressure hydrogen producing apparatus 12. The hydrogen-liquid separator 82 includes a tank 84 that is provided with a water level sensor 86 which detects a water level in the tank 84. The high-pressure hydrogen pipe 20 is connected to the lower end of the tank 84. The outlet of the high-pressure hydrogen pipe 20 is normally open at a position lower than the water level in the tank 84.

In the water electrolysis system 80 with the foregoing configuration, the water level sensor 86 detects a change in water level in the tank 84 at the time of water electrolysis. When the water level in the tank 84 rises, it is determined that the amount of moisture in high-pressure hydrogen generated on the cathode side from the first cell unit 24a is larger than the amount of moisture permeating to the anode side from the cathode side by the second cell unit 24b.

When the water level in the tank 84 falls, it is determined that the amount of moisture in high-pressure hydrogen generated on the cathode side from the first cell unit 24a is less than the amount of moisture permeating to the anode side from the cathode side by the second cell unit 24b. Therefore, management of moisture can be reliably and easily carried out by setting the current to the electrolysis power supply 38 variable.

According to the embodiment, there is provided a high-pressure hydrogen producing apparatus for electrolyzing water supplied to an anode side to generate oxygen on the anode side and hydrogen with a pressure higher than that of the oxygen on a cathode side.

The high-pressure hydrogen producing apparatus includes a first cell unit having a plurality of first unit cells stacked in a gravitational direction, and a second cell unit coupled to a lower end of the first cell unit in the gravitational direction and having a plurality of second unit cells stacked in the gravitational direction.

The first cell unit includes an electrolyte membrane, an anode electrode catalyst layer and an anode current collector provided on one surface of the electrolyte membrane, and a cathode electrode catalyst layer and a cathode current collector provided on an opposite surface of the electrolyte membrane, and serves as a water electrolysis cell to electrolyze the water.

The second cell unit includes the electrolyte membrane, the anode current collector provided on the one surface of the electrolyte membrane, and the cathode current collector provided on the opposite surface of the electrolyte membrane, and serves as a water permeation cell to cause moisture on the cathode side to permeate toward the anode side.

The high-pressure hydrogen producing apparatus preferably further includes a water supply passage passing through the first cell unit and the second cell unit in the stacking direction to supply the water, an oxygen discharge passage passing through the first cell unit and the second cell unit in the stacking direction to discharge oxygen generated by a reaction and used water, and a hydrogen discharge passage passing through the first cell unit and the second cell unit in the stacking direction to discharge hydrogen generated by a reaction.

According to the embodiment, the second cell unit is not provided with an anode electrode catalyst layer and a cathode electrode catalyst layer, so that the second cell unit does not have a water electrolysis capability. Therefore, the second cell unit can serve as a water permeation cell to cause moisture contained in high-pressure hydrogen generated on the cathode side or the high-pressure side to permeate toward the anode side or the low-pressure side.

Therefore, the electrolyte membrane can permit high-pressure water to permeate toward the low-pressure side to be discharged efficiently, thus eliminating the need for large equipment for discharging the high-pressure water. In addition, because the second cell unit is structured in a way similar to the fabrication of the first cell unit, the second cell unit can be easily coupled to the first cell unit.

The structure can make it possible to effectively reduce the number of components and achieve further downsizing and a simpler configuration of the apparatus.

Obviously, numerous modifications and variations of the present invention are possible in light of the above teachings. It is therefore to be understood that within the scope of the appended claims, the invention may be practiced otherwise than as specifically described herein.

What is claimed is:

1. A high-pressure hydrogen producing apparatus for electrolyzing water supplied to an anode side to generate oxygen on the anode side and hydrogen with a pressure higher than a pressure of the oxygen on a cathode side, comprising:
    a first cell device having a plurality of first unit cells stacked in a gravitational direction;
    a second cell device coupled to a lower end of the first cell device in the gravitational direction and having a plurality of second unit cells stacked in the gravitational direction;
    the first cell device serving as a water electrolysis cell to electrolyze the water, the first cell device including an electrolyte membrane, an anode electrode catalyst layer and an anode current collector provided on a first surface of the electrolyte membrane, and a cathode electrode catalyst layer and a cathode current collector provided on a second surface of the electrolyte membrane, the second surface being provided on an opposite side of the electrolyte membrane to the first surface in the first cell device; and
    the second cell device serving as a water permeation cell to cause moisture on the cathode side to permeate toward the anode side, the second cell device including an electrolyte membrane, an anode current collector provided on a first surface of the electrolyte membrane of the second cell device, and a cathode current collector provided on a second surface of the electrolyte membrane of the second cell device, the second surface being provided on an opposite side of the electrolyte membrane to the first surface in the second cell device.

2. The high-pressure hydrogen producing apparatus according to claim 1, further comprising:
    a water supply passage passing through the first cell device and the second cell device in the gravitational direction to supply the water;
    an oxygen discharge passage passing through the first cell device and the second cell device in the gravitational direction to discharge oxygen generated by a reaction and used water; and
    a hydrogen discharge passage passing through the first cell device and the second cell device in the gravitational direction to discharge hydrogen generated by a reaction.

3. The high-pressure hydrogen producing apparatus according to claim 1, wherein
    the anode electrode catalyst layer is provided between the first surface of the electrolyte membrane and the anode current collector in the first cell device, and
    the cathode electrode catalyst layer is provided between the second surface of the electrolyte membrane and the cathode current collector in the first cell device.

4. The high-pressure hydrogen producing apparatus according to claim 3, wherein
    an anode electrode catalyst layer is not provided between the first surface of the electrolyte membrane and the anode current collector in the second cell device, and
    a cathode electrode catalyst layer is not provided between the second surface of the electrolyte membrane and the cathode current collector in the second cell device.

5. The high-pressure hydrogen producing apparatus according to claim 1, wherein
    an anode electrode catalyst layer is not provided between the first surface of the electrolyte membrane and the anode current collector in the second cell device, and
    a cathode electrode catalyst layer is not provided between the second surface of the electrolyte membrane and the cathode current collector in the second cell device.

* * * * *